(12) United States Patent
Goto

(10) Patent No.: US 9,882,880 B2
(45) Date of Patent: Jan. 30, 2018

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 14/258,983

(22) Filed: Apr. 22, 2014

(65) Prior Publication Data
US 2014/0325049 A1 Oct. 30, 2014

(30) Foreign Application Priority Data
Apr. 24, 2013 (JP) .................. 2013-091422

(51) Int. Cl.
*G06F 15/173* (2006.01)
*H04L 29/06* (2006.01)
*H04L 29/08* (2006.01)

(52) U.S. Cl.
CPC ......... *H04L 63/0428* (2013.01); *H04L 63/08* (2013.01); *H04L 67/16* (2013.01)

(58) Field of Classification Search
USPC ........................................ 709/223, 224, 225
See application file for complete search history.

(56) References Cited

U.S. PATENT DOCUMENTS

| | | | | |
|---|---|---|---|---|
| 7,143,134 | B2 * | 11/2006 | Petrie | G06Q 10/10 709/204 |
| 7,305,466 | B1 * | 12/2007 | Kaffine | H04L 12/2602 703/21 |
| 2004/0078384 | A1 * | 4/2004 | Keir | G02B 5/3083 |
| 2007/0011319 | A1 * | 1/2007 | McClure | G02B 6/105 709/224 |
| 2007/0141984 | A1 * | 6/2007 | Kuehnel | H04W 4/008 455/41.2 |
| 2007/0141986 | A1 * | 6/2007 | Kuehnel | H04W 48/16 455/41.2 |
| 2011/0280233 | A1 * | 11/2011 | Choi et al. | 370/338 |
| 2013/0057908 | A1 * | 3/2013 | Park | H04L 61/2015 358/1.15 |

FOREIGN PATENT DOCUMENTS

| | | |
|---|---|---|
| JP | 2003-219056 A | 7/2003 |
| JP | 2009-152689 A | 7/2009 |
| JP | 2011-35768 A | 2/2011 |
| JP | 2012-227648 A | 11/2012 |

OTHER PUBLICATIONS http://blog.broadcom.com/wp-content/uploads/2013/10/Wi-Fi-Direct-White-Paper.pdf.

* cited by examiner

*Primary Examiner* — Normin Abedin
(74) *Attorney, Agent, or Firm* — Canon USA Inc., IP Division

(57) ABSTRACT

A communication apparatus acquires information about a service provided by another communication apparatus and identifies a service executable between the communication apparatus and the another communication apparatus based on the acquired information and a service executable by the communication apparatus. If a plurality of services is identified, the communication apparatus controls a port corresponding to each of the plurality of the identified services.

16 Claims, 7 Drawing Sheets

COMMUNICATION APPARATUS, METHOD FOR CONTROLLING THE SAME, AND STORAGE MEDIUM

BACKGROUND

Field

Aspects of the present invention generally relate to a communication apparatus, a method for controlling the same, and a storage medium.

Description of the Related Art

In recent years, an electronic apparatus, such as a digital camera and a printer, is equipped with a wireless local area network (LAN) station function, connected to a wireless LAN, and often used as a communication apparatus. For example, Japanese Patent Application Laid-Open No. 2009-152689 discusses a method for facilitating image sharing by providing a wireless LAN function for the digital camera.

Wi-Fi Direct® has been established as a Wi-Fi standard by Wi-Fi Alliance. The Wi-Fi Direct® prescribes a protocol determining whether each electronic apparatus operates as a wireless LAN access point or a wireless LAN station. By executing the protocol, it can be automatically determined which electronic apparatus operates as the wireless LAN access point or the wireless LAN station. The use of the Wi-Fi Direct® eliminates the need for separately preparing an access point. Consequently, the electronic apparatuses can directly communicate with each other and execute various services (image sharing, printing, and the like). Therefore, user friendliness is improved.

A function for searching an application layer for contents of a service provided by other apparatus (a service discovery function) is prescribed as an optional function of the Wi-Fi Direct®. The service discovery function enables the electric apparatus to acquire information about a service provided by an electronic apparatus to be connected before connection processing is executed. Therefore, user friendliness is improved.

As described above, in the Wi-Fi Direct®, service information is exchanged between the electric apparatuses in the wireless LAN layer. However, service processing actually executed is generally executed in a layer upper than a Transmission Control Protocol (TCP)/Internet Protocol (IP) layer (an application layer, for example). For this reason, control of opening and closing of a port (a User Datagram Protocol (UDP) port or a TCP port, for example) is required to execute the service processing.

In a case where there is a plurality of service types executable between the electric apparatuses, control of opening and closing of the corresponding port is performed every time a service to be executed is identified. It is inefficient from the viewpoint of opening processing time.

The present invention is directed to effective port control in executing a service between electric apparatuses.

SUMMARY OF THE INVENTION

An aspect of the present invention is generally directed to effective port control in executing a service between electric apparatuses.

According to an aspect of the present invention, a communication apparatus includes a search unit configured to search for another communication apparatus, an acquisition unit configured to acquire information about a service provided by the another communication apparatus, an identification unit configured to identify a service executable between the communication apparatus and the another communication apparatus based on the information acquired by the acquisition unit and a service executable by the communication apparatus, and a control unit configured to control, if a plurality of services is identified by the identification unit, a port corresponding to each of the plurality of the identified services.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

A communication apparatus according to a first exemplary embodiment is described in detail below with reference to the attached drawings. The following describes an example using a wireless LAN system conforming to the Institute of Electrical and Electronics Engineers (IEEE) 802.11 series. However, a communication format is not necessarily limited to the wireless LAN system conforming to the IEEE 802.11.

A hardware configuration preferable to the present exemplary embodiment is described below.

Figure 1:
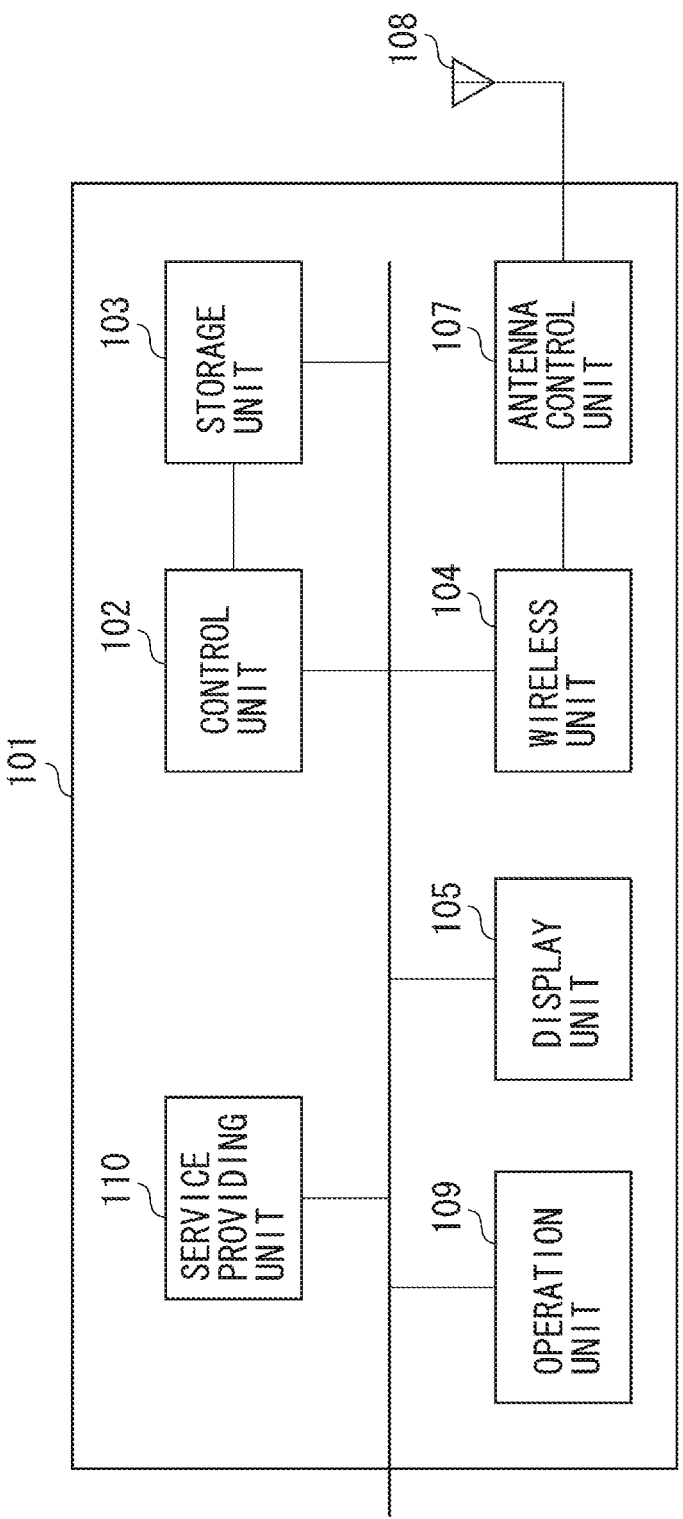
FIG. 1 is a block diagram illustrating a configuration of a communication apparatus.

FIG. 1 is a block diagram illustrating a configuration example of each communication apparatus 101 described below, according to an exemplary embodiment. A communication apparatus 101 includes a control unit 102 and a storage unit 103. The control unit 102 executes a control program stored in the storage unit 103 to control the entire communication apparatus 101. The control unit 102 includes a processor, such as one or a plurality of central processing units (CPU) or micro processing units (MPU). The control unit 102 performs setting control of communication parameters with another apparatus. The storage unit 103 stores the control program to be executed by the control unit 102 and various pieces of information, such as communication parameters. The storage unit 103 may store image data and files generated by the communication apparatus 101 or received from an external apparatus. The storage unit 103 includes various types of memories, such as a read only memory (ROM), a random access memory (RAM), a hard disk drive (HDD), and a flash memory. The control unit 102 executes the control program stored in the storage unit 103 so as to realize various operations described below.

A wireless unit 104 performs wireless LAN communication conforming to the IEEE 802.11 series. A display unit 105 performs various kinds of displaying. The display unit 105 includes, for example, a liquid crystal display (LCD) or a light emitting diode (LED), which can output visually recognizable information or a speaker that has a function to output sound. The display unit 105 has a function to output at least one of visual information and sound information.

The communication apparatus 101 further includes an antenna control unit 107 and an antenna 108. The antenna control unit 107 controls the antenna 108 to transmit and receive signals through wireless communication. An operation unit 109 allows a user to perform various inputs to operate the communication apparatus 101. The operation unit 109 includes various buttons and a touch panel.

A service provision unit 110 includes a function to provide service information of an application level provided by the communication apparatus 101. In a case where the communication apparatus 101 is a printer, the service provision unit 110 provides a printing function. In a case where the communication apparatus 101 is a digital camera, the service provision unit 110 provides an imaging function.

The configuration illustrated in FIG. 1 is a mere example. The communication apparatus 101 may include a hardware configuration instead of the hardware configuration illustrated in FIG. 1. In a case where the communication apparatus 101 is a printer, the communication apparatus 101 includes a printing unit. In a case where the communication apparatus 101 is a digital camera, the communication apparatus 101 includes an imaging unit.

Figure 2:
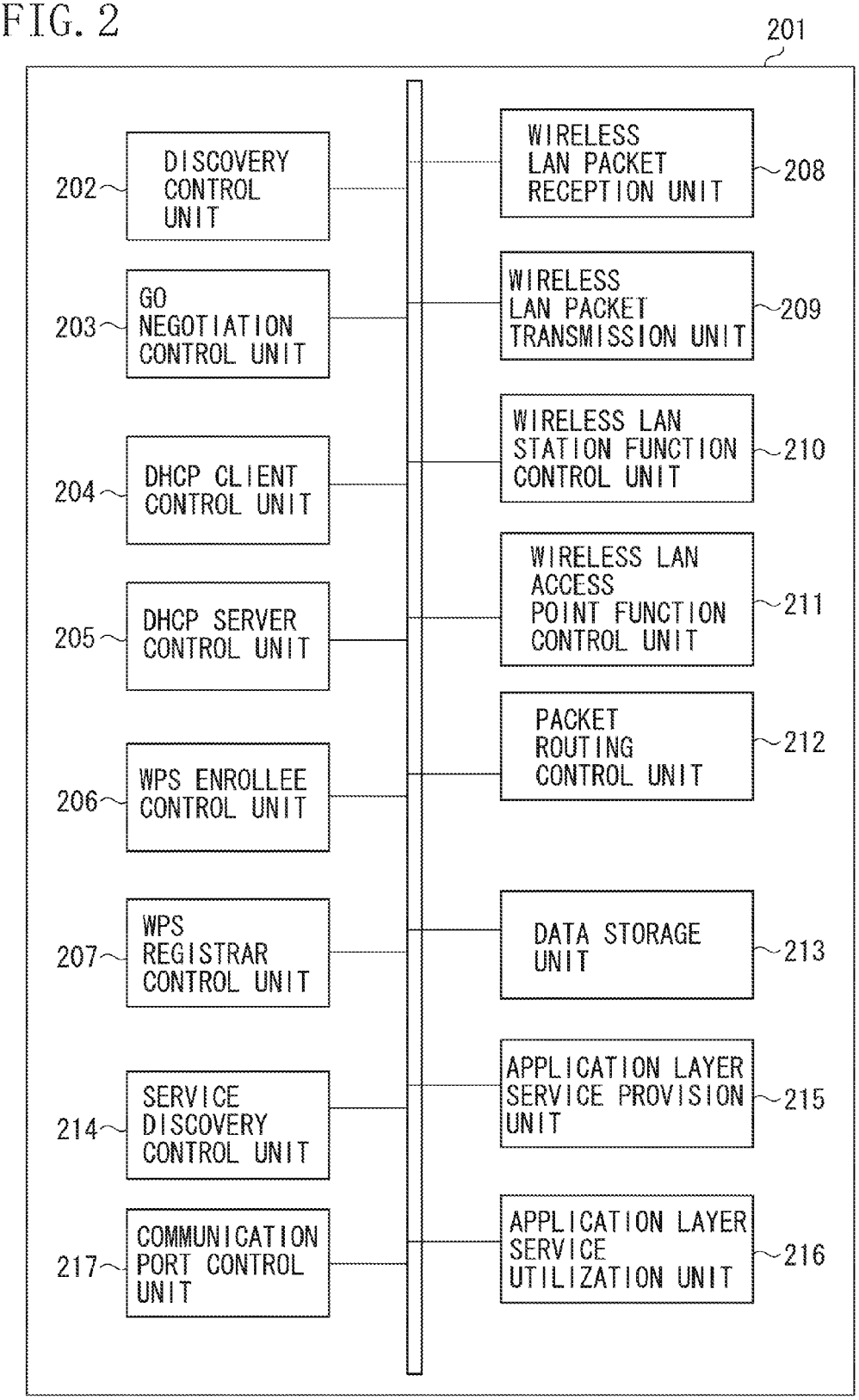
FIG. 2 is a block diagram illustrating a software function of the communication apparatus.

FIG. 2 is a block diagram illustrating a configuration example of a software function which executes a communication control function described below. A software function block 201 includes the following units. A discovery control unit 202 operates search processing for searching another communication apparatus as a communication partner.

A group owner (GO) negotiation control unit 203 performs control based on a wireless fidelity (Wi-Fi) direct protocol specification and determines which communication apparatus becomes a wireless LAN access point or a wireless LAN station as a role between the communication apparatuses in a wireless layer. According to the Wi-Fi Direct®, the communication apparatus that executes a wireless LAN access point function is referred to as peer-to-peer (P2P) group owner (hereinbelow, referred to as GO), and another communication apparatus that executes a wireless LAN station function is referred to as P2P client (hereinbelow, referred to as CL). In a case where the communication apparatus becomes the GO or the wireless LAN access point, a wireless LAN access point function control unit 211 described below is activated. In a case where the communication apparatus becomes the CL or the wireless LAN station, a wireless LAN station function control unit 210 described below is activated. The protocol of the GO negotiation is determined by the Wi-Fi Direct® specification. Since this is not relevant to the present embodiment, a detailed description is omitted herein. According to the Wi-Fi Direct®, a network established by the GO is referred to as a P2P group. In the present exemplary embodiment, a network may be referred to as the P2P group and there is not specific difference between them.

In the present exemplary embodiment, the P2P group owner (GO), the P2P client (CL), and a communication apparatus group having undetermined role are collectively referred to as a P2 device.

A dynamic host configuration protocol (DHCP) client control unit 204 is activated when the role of the communication apparatus is determined as the wireless LAN station by the GO negotiation control unit 203. A DHCP server control unit 205 is activated when the role of the communication apparatus is determined as the wireless LAN access point by the GO negotiation control unit 203.

A Wi-Fi protected setup (WPS) enrollee control unit 206 receives a communication parameter required for communication of the wireless LAN from another WPS registrar apparatus. As well as the case of the DHCP client control unit 204, the WPS enrollee control unit 206 operates when the role of the communication apparatus is the wireless LAN station. A WPS registrar control unit 207 provides another WPS enrollee apparatus with communication parameters required for communication of the wireless LAN. As well as the case of the DHCP server control unit 205, the WPS registrar control unit 207 operates when the role of the communication apparatus is the wireless LAN access point. The communication parameters provided by the WPS registrar control unit 207 include a service set identifier (SSID) being a network identifier, a cryptographic key, an encryption method, an authentication key, and an authentication method.

A wireless LAN packet reception unit 208 and a wireless LAN packet transmission unit 209 receives and transmits all packets including a communication protocol of an upper layer. The wireless LAN station function control unit 210 executes authentication and encryption processing when the communication apparatus is operated as the wireless LAN station, and the communication apparatus participates in a wireless network established by another communication apparatus operated as the wireless LAN access point. The wireless LAN access point function control unit 211 establishes a wireless network when the communication apparatus is operated as the wireless LAN access point function, and executes authentication and encryption processing and management of the a communication partner apparatus. The functions of the wireless LAN station function control unit 210 and the wireless LAN access point function control unit 211 are operable singly or simultaneously.

A packet routing control unit 212 bridges and routes a communication packet during the operation of the wireless LAN access point function control unit 211. A data storage unit 213 stores and holds software itself, wireless LAN parameters, and various tables, such as a DHCP address table and an address resolution protocol (ARP) table.

A service discovery control unit 214 controls a service discovery function specific to the Wi-Fi Direct®. The service discovery function is for exchanging service information held by the communication partner apparatus by transmitting and receiving an action frame defined in the IEEE 802.11u. More specifically, the service discovery control unit 214 transmits a selective drill-down (SD) Query and receives an SD Response as a response. Alternatively, the service discovery control unit 214 receives an SD Query from the communication partner apparatus and transmits an SD Response as a response. According to the present exemplary embodiment, the service information refers to information about a service of the application layer provided by the communication apparatus. The service of the application layer includes a printing service, a moving image streaming service, and a file transfer service. The service information sometimes includes identification information, such as a uniform resource locator (URL) for accessing a service provided by the communication apparatus.

An application layer service provision unit 215 provides a service of the application layer. The application layer is referred to as a service provision layer in a layer equal to or upper than a fifth layer in an open systems interconnection (OSI) reference model. More specifically, the service provision unit 215 provides a printing function (printing service), an image streaming function (moving image streaming service), and a file transmitting function (file transmitting service), for example.

An application layer service utilization unit 216 utilizes a service in an application layer provided by a service provision unit of the application layer of a communication partner apparatus. More specifically, the application layer service utilization unit 216 controls a function to transmit a print document to a printing service provision unit and a function to transmit a moving image to a digital display.

A communication port control unit 217 controls opening and closing of a port required for executing service in the application layer. More specifically, the communication port control unit 217 controls opening and closing of a transmission control protocol (TCP) port or a user datagram protocol (UDP) port. A port is allocated for each service provided in the application layer and a search protocol. Therefore, the communication port control unit 217 performs a port opening processing (port open) when the communication apparatus executes communication for utilizing the service. Furthermore, the communication port control unit 217 performs control for closing a port (port close) unnecessary for communication for utilizing a service.

All of the functional blocks illustrated in FIG. 2 are not limited to ones provided by software, but at least a part thereof may be provided by hardware. The functional blocks illustrated in FIG. 2 are related with each other. The functional blocks illustrated in FIG. 2 are mere examples. A plurality of the functional blocks may constitute one functional block, or some of the functional blocks may be further divided into blocks that perform a plurality of functions.

In the present exemplary embodiment, a service in the application layer is realized by an apparatus providing the service and an apparatus utilizing the service. In a case where the service in the application layer is a printing service, the service provision apparatus is a printer, which receives and prints print data sent from a personal computer (PC) and others. The service utilization apparatus is an apparatus, such as a PC, which generates print data and transmits the print data to the printer as the service provision apparatus. In a case where the service in the application layer is an image streaming service, the service provision apparatus is a display device, which receives and displays image data sent from a PC and others. The service utilization apparatus is an apparatus, such as a PC, which generates image data and transmits the image data to the display device as the service provision apparatus.

Figure 3:
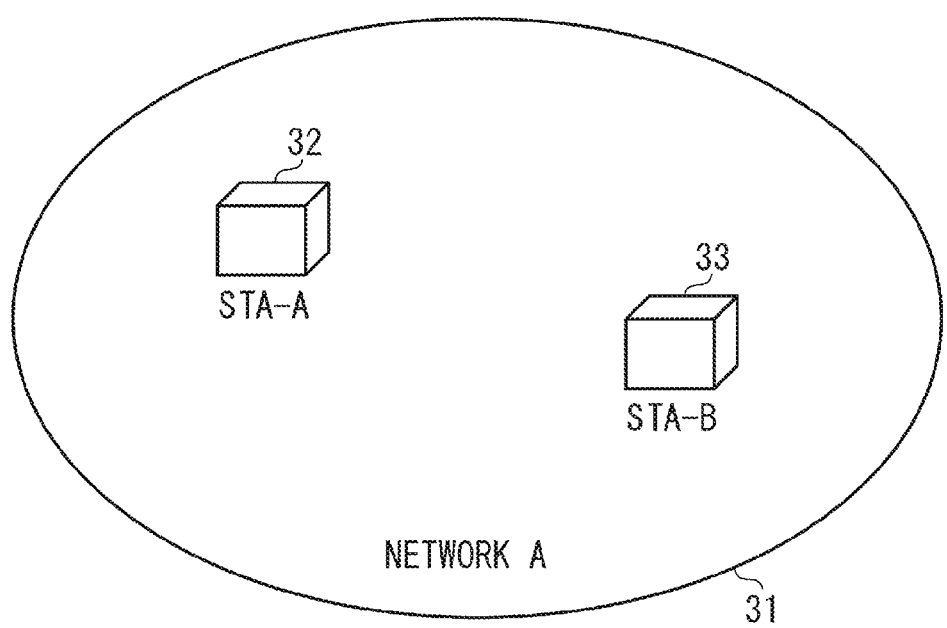
FIG. 3 is a diagram illustrating an example of network configuration.

FIG. 3 is a diagram illustrating a communication apparatus 32 (hereinbelow, referred to as STA-A), a communication apparatus 33 (hereinbelow, referred to as STA-B), and a network A31 (hereinbelow, referred to as network A) including the STA-A and the STA-B. The STA-A and the STA-B have the configuration illustrated in FIGS. 1 and 2 described above. The STA-A and the STA-B support the Wi-Fi Direct® and execute the processing illustrated in a sequence diagram and flowcharts of FIGS. 4 to 7 described below. One of the apparatuses between the STA-A and the STA-B operated as the GO establishes the network A. The other apparatus therebetween operated as the CL participates in the established network A.

Figure 4:
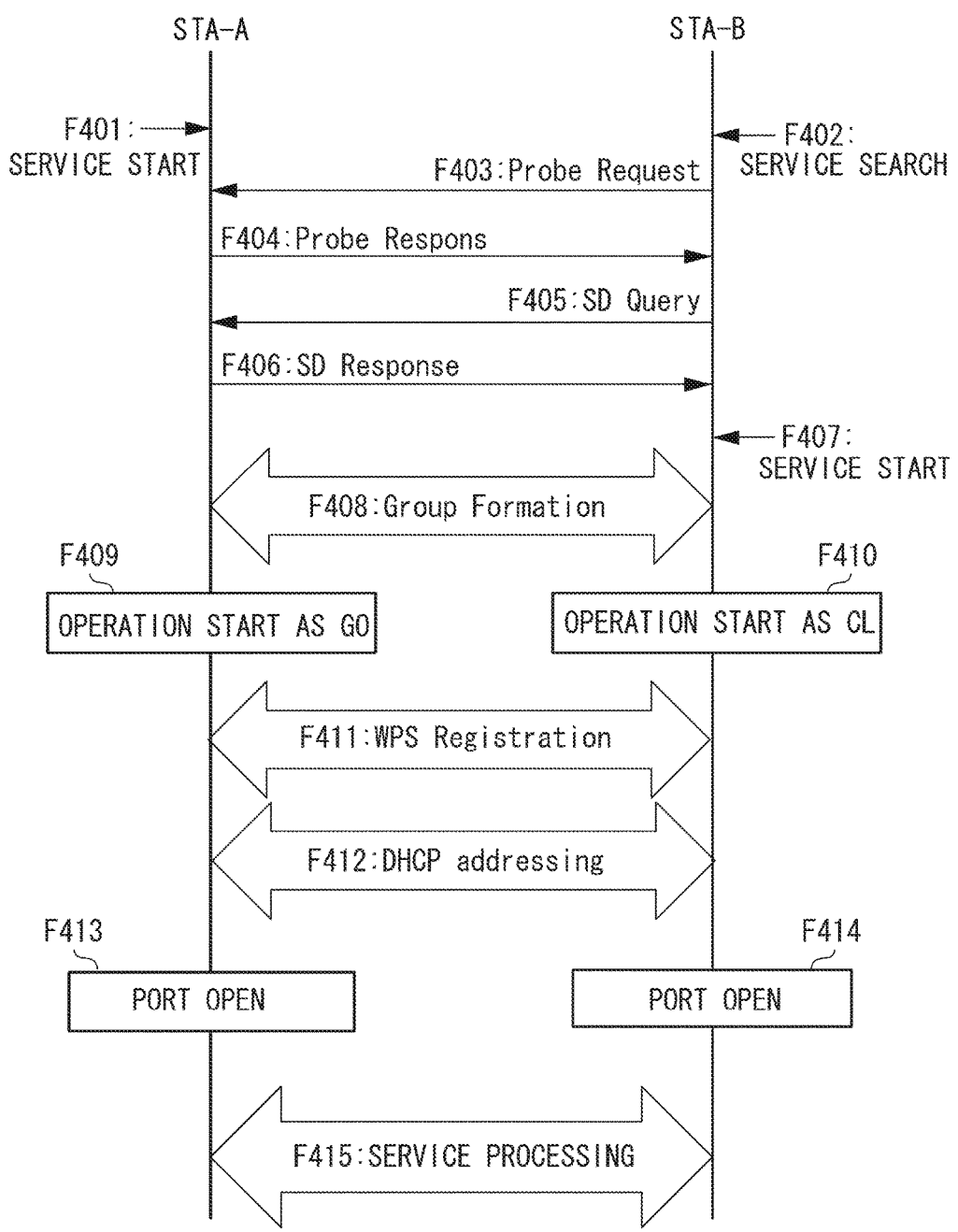
FIG. 4 is a sequence diagram illustrating an example of processing performed between communication apparatuses according to a first exemplary embodiment.

FIG. 4 is a sequence diagram illustrating processing performed between the STA-A and the STA-B according to the present exemplary embodiment. In FIG. 4, a service search is performed using the service discovery function defined in the Wi-Fi Direct® specification before connection processing of the wireless LAN is performed. If a desired communication apparatus exists, the wireless LAN connection processing is performed. FIG. 4 also illustrates sequence processing performed between the communication apparatuses in a case where the port for a service is opened to perform service processing.

In step F401, a user instructs the STA-A as the service provision apparatus to start providing a service. In step F402, the user instructs the STA-B as the service utilization apparatus to start service search processing to search for the service provision apparatus.

In the present embodiment, the service utilization apparatus and the service provision apparatus in the application layer refer to the following, for example. In a case where the service in the application layer is a printing service, the service utilization apparatus is an apparatus which has images and data to be printed and transmits print data to the service provision apparatus. The service provision apparatus is an apparatus which has a printing function and prints the print data sent from the service utilization apparatus. More specifically, the service utilization apparatus is a PC, a digital camera, and a smart phone. The service provision apparatus is a printer and a multifunction peripheral. In a case where the service in the application layer is an image streaming service, the service utilization apparatus is an image recording apparatus, such as a digital camera and a camcorder, and the service provision apparatus is an image display device, such as a digital television (TV) and a projector.

In a case where the service in the application layer is a Digital Living Network Alliance (DLNA) (registered trademark), the service utilization apparatus is a digital media server (DMS) and the service provision apparatus is a digital media renderer (DMR), for example. Because there are various device classes in DLNA standards, the above description is merely an example. For further details, refer to the DLNA standards.

In a case where the service in the application layer is Wi-Fi Miracast®, the service provision apparatus is an image display device called Sink and the service utilization apparatus is an image storage device called Source.

With regard to an apparatus supporting a universal plug and play (UPnP) protocol, the service provision apparatus is a UPnP device and the service utilization apparatus is a control point. The service and the role thereof exemplified here are merely examples, and are not seen to be limiting.

In step F403, the STA-B, which is instructed to perform the service search processing, transmits a Probe Request signal in broadcast mode in order to search for an apparatus to be a communication partner before the service search processing is performed.

In step F404, if the STA-A receives the probe request signal, the STA-A returns a probe response signal to the STA-B. The STA-B can recognize the presence of the STA-A as a candidate device of the communication partner by receiving the probe response signal. In step F405, the STA-B transmits an SD Query signal to check if the STA-A can provide the service desired by the user. The SD Query signal is a query signal for inquiring the destination communication apparatus of whether the desired service can be provided. The SD Query signal may designate a wild card for searching for all services or a specific service (hereinbelow, referred to as individual designation). The inquiry using the SD Query signal can be performed before the communication apparatuses are connected each other through the wireless LAN (in the state of pre-association).

In step F406, the STA-A, which has received the SD Query signal, transmits an SD Response signal as a response. If the SD Query signal designates the wild card, the SD Response signal includes information about the service provided by the STA-A. If the SD Query signal designates a specific service, the SD Response signal includes information about whether the STA-A can provide the specific service. The STA-A stores identification information, such as a media access control (MAC) address, of the STA-B, which has transmitted the SD Query signal, in its storage unit when transmits the SD Response signal.

The STA-B refers to the contents of the SD Response signal. If the user determines or the communication apparatus autonomously determines that the STA-A can provide the desired service, the STA-B stores identification information, such as the MAC address, of the STA-A into the storage unit. In step F407, the STA-B issues an instruction to start the desired service in response to the user's instructions.

In the above described example, the inquiries about providing services are performed by using the SD Query signal after the communication apparatus is searched by the probe request signal. However, the service provided by the communication partner may also be searched only by transmitting the probe request signal to which an additional information element related to the service in the application layer is added. In this case, the SD Query signal and the SD Response signal do not need to be exchanged. However, the identification information, such as their respective MAC addresses, is similarly stored each other.

The STA-B executes the wireless LAN connection processing according to the instruction of starting the service in step F407 illustrated in FIG. 4. In the present exemplary embodiment, in step F408, the STA-B executes group formation processing to execute the wireless LAN connection processing based on the Wi-Fi Direct® specification. The present processing is controlled by the GO negotiation control unit 203 described above. As described above, the group formation processing refers to role determination processing for determining which of the two communication apparatuses becomes the GO or the CL. As a result of the role determination processing, in step F409, it is presumed that the STA-A starts operating as the GO and, in step F410, the STA-B starts operating as the CL.

In step F411, WPS parameter exchange processing is executed with the STA-A as the WPS registrar and the STA-B as the WPS enrollee.

In step F412, address setting processing is thus executed with the STA-A as the DHCP server and the STA-B as the DHCP client.

Service information about their respective devices is exchanged by the service discovery processing in steps F405 and F406. Then, in steps F413 and F414, the STA-A and the STA-B open the TCP port or the UDP port used for the already recognized service.

In step F415, the service in the application layer on the TCP/IP layer can be executed by performing the port open processing in steps F413 and F414.

The present sequence diagram illustrated the processing example in which the service utilization apparatus transmits various signals and receives a response to each signal from the service provision apparatus. Alternatively, the service provision apparatus may transmit a query signal and receive a response to the query signal from the service utilization apparatus. The transmission device for transmitting a query signal may be changed according to the type of a signal.

Figure 5:
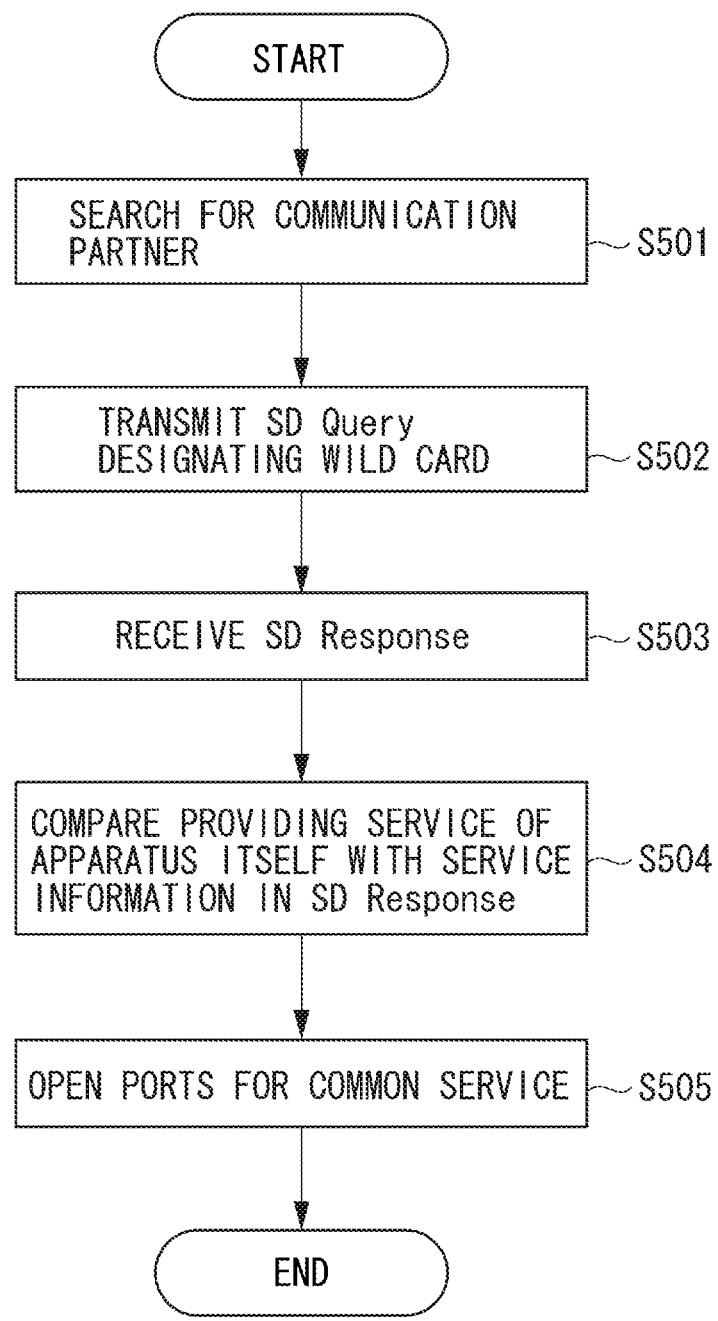
FIG. 5 is a flowchart illustrating an example of processing performed by the communication apparatus according to the first exemplary embodiment.
Figure 6:
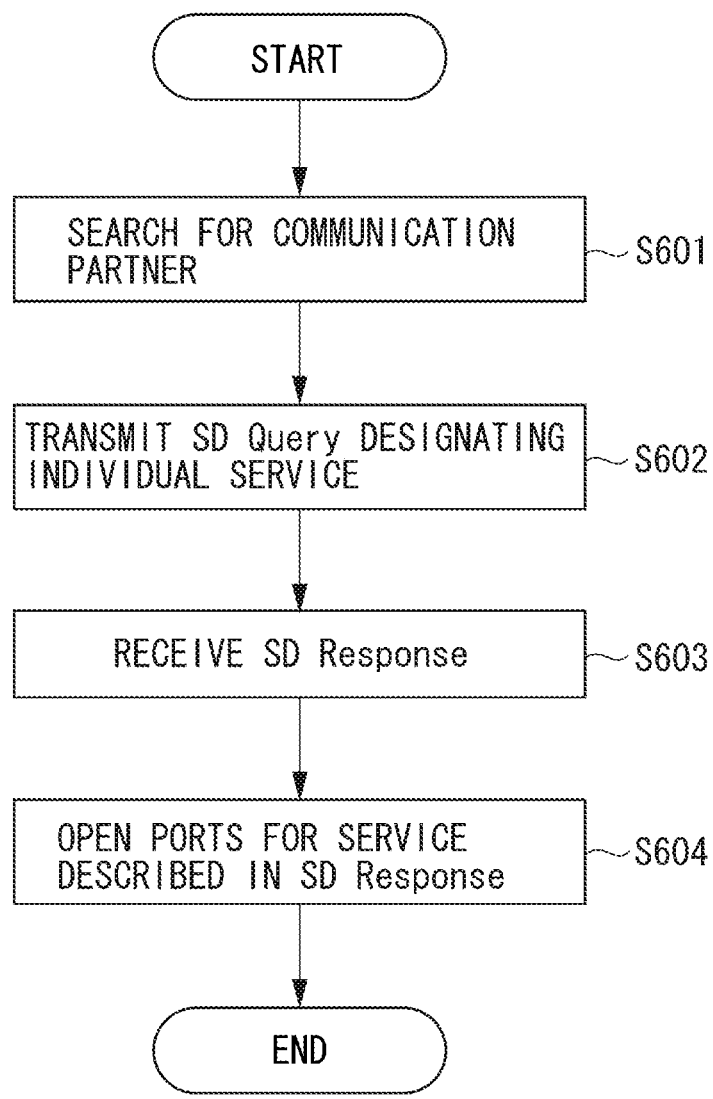
FIG. 6 is a flowchart illustrating an example of processing performed by the communication apparatus according to a second exemplary embodiment.
Figure 7:
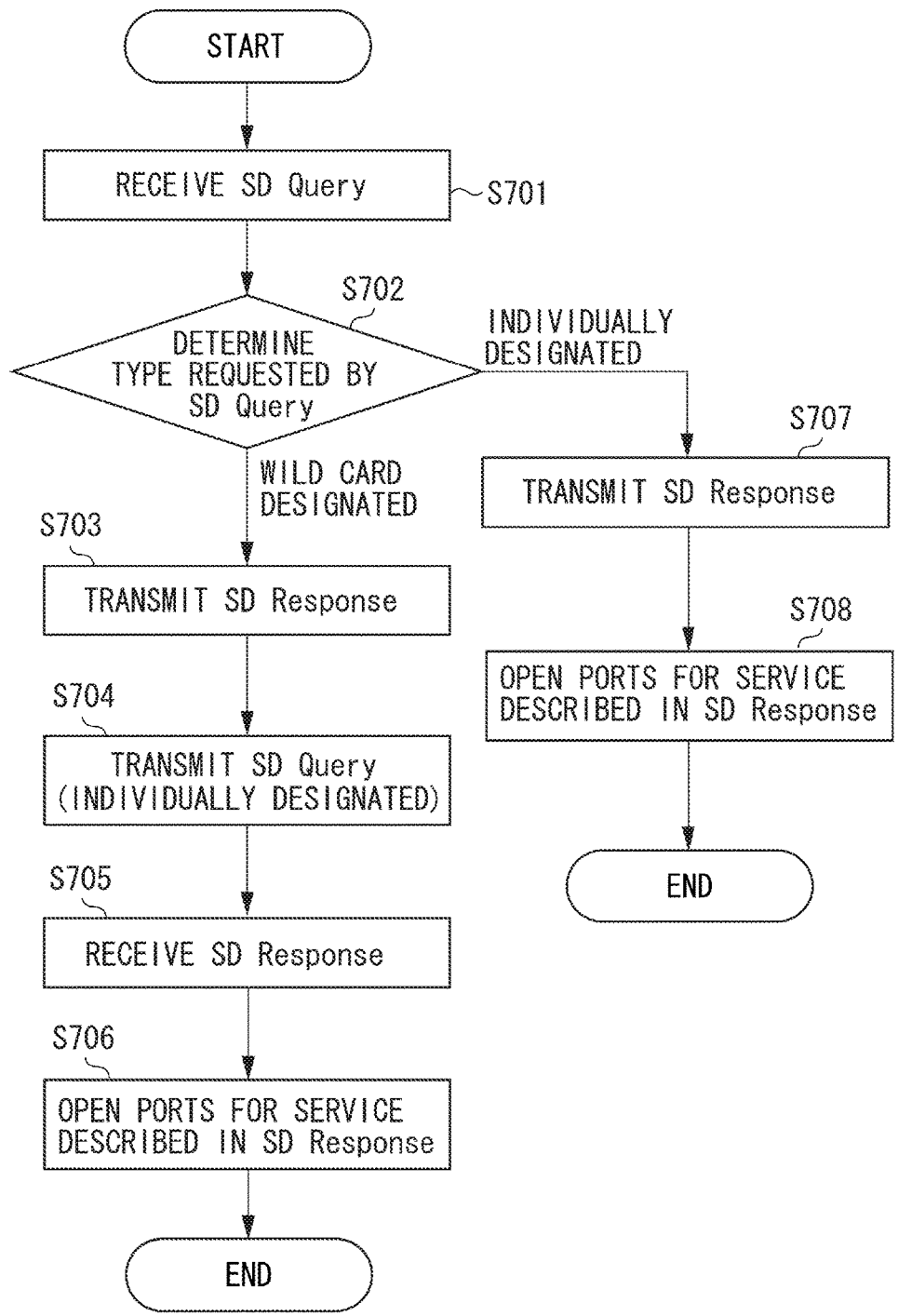
FIG. 7 is a flowchart illustrating an example of processing performed by the communication apparatus according to a third exemplary embodiment.

FIG. 5 is a flowchart illustrating the processing of the communication apparatus according to the present exemplary embodiment. Each step of the flow chart is processed by executing the program stored in the storage unit 103 by the control unit 102.

In step S501, the communication apparatus searches for another communication apparatus to be a communication partner by the search method defined in the Wi-Fi Direct® specification. In step S502, as a result of the search, if the communication partner is detected, the communication apparatus transmits the SD Query designating the wild card to the communication partner. Since the IEEE 802.11 specification prescribes that the SD Query shall be transmitted in a unicast mode, the communication partner is searched in step S501 and then the SD Query is transmitted in step S502. However, a signal is not limited to the SD Query signal. As long as the signal is for performing a notification about service information of the communication apparatus, the processing in step S501 may be omitted, and a service information search signal may be transmitted in a multicast or broadcast mode.

In step S503, the communication apparatus transmits the SD Query and waits for and receives the SD Response from the communication partner. The communication partner, which has received the SD Query designating the wild card, transmits the SD Response describing all the pieces of service information provided by the communication partner to the communication apparatus. The SD Response is also merely an example used for describing the present exemplary embodiment conforming to the IEEE 802.11 specification. The signal is not limited to the SD Response signal as long as the signal is for performing notification about service information of the communication apparatus.

In step S504, the communication apparatus refers to the service information included in the SD Response received in step S503 to acquire information about the service, which the communication partner can provide, and compares the acquired information with the information about the service, which the communication apparatus can execute.

In step S505, as a result of comparison in step S504, the communication apparatus identifies the service common to both of the apparatuses, i.e., the service executable between the communication apparatus and the communication partner. and the communication apparatus opens all the ports used for the identified service (port open). If there is a plurality of the identified services, the communication apparatus collectively opens a plurality of ports corresponding to the plurality of the respective services.

As described above, according to the present exemplary embodiment, all of the plurality of ports related to the service which can be executed between the communication apparatuses are opened according as the plurality of ports can be identified. This enables reducing the time required up to provision of a service particularly in executing a plurality of the services.

In the first exemplary embodiment as described above, the service provision port is opened based on the search result using the SD Query designating the wild card. In a second exemplary embodiment, transmission of an SD Query designating an individual service is described below with reference to FIG. 6. The configuration of hardware and software of the communication apparatus and the connection processing thereof excluding port control are similar to those of the first exemplary embodiment, so that the description thereof is omitted.

In step S601, the communication apparatus searches for another communication apparatus to be a communication partner by the search method prescribed in the Wi-Fi Direct® specification. In step S602, if the communication partner is detected as a result of the search, the communication apparatus transmits an SD Query designating one or more services desired to be used by the communication apparatus to the communication partner.

In step S603, the communication apparatus transmits the SD Query and waits for and receives the SD Response from the communication partner. The communication partner, which has received the SD Query individually designating service, performs response processing only if the communication partner can provide the designated service. Therefore, the reception of the SD Response from the communication partner in step S603 indicates that the communication apparatus can execute the individually designated service with the communication partner.

In step S604, the communication apparatus opens all ports for the service described in the SD Response in step S604. Specifically, the communication apparatus opens all the ports corresponding to the service individually designated in the SD Query transmitted by the communication apparatus.

As described above, according to the present exemplary embodiment, the port related to the service that can be executed between the communication apparatuses can be opened in advance. Consequently, the time required up to provision of the service can be reduced.

In the first and second exemplary embodiments, the operation of the communication apparatus executing the search is described above with reference to FIGS. 5 and 6. In a third exemplary embodiment, the operation of the communication apparatus that becomes an apparatus to be searched for is described below with reference to FIG. 7. The configuration of hardware and software of the communication apparatus and the connection processing thereof excluding port control are similar to those of the first exemplary embodiment, so that the description thereof is omitted.

The communication apparatus is searched for by a communication apparatus to be a communication partner by the search method prescribed in the Wi-Fi Direct® specification. In step S701, if the communication apparatus has been searched for by the communication partner, the communication apparatus receives the SD Query.

In step S702, the communication apparatus determines a requested type of the received SD Query. If a requested type is the individual designation, the communication apparatus determines whether the communication apparatus supports the requested service based on the requested service information. As a result of the determination, if the communication apparatus can provide the requested service, in step S707, the communication apparatus transmits the SD Response.

In step S708, the communication apparatus opens all ports for the service described in the SD Response transmitted in step S707.

On the other hand, in step S702, if the SD Query designates the wild card, the processing proceed to step S703.

In step S703, if the SD Query designates the wild card, the communication apparatus transmits the SD Response describing all the providing services. Subsequently, in step S704, the communication apparatus transmits the individual-designated SD Query with information about the services to be used with the communication partner.

In step S705, the communication apparatus receives the SD Response from the communication partner. Then, the services to be used between the communication apparatuses are determined. In step S706, the communication apparatus opens all ports for the services described in the SD Response received in step S705. As described above, according to the present exemplary embodiment, the ports for the service actually required between the communication apparatuses are collectively opened in advance and control of the opening and closing of the ports for the service can be performed effectively.

The above exemplary embodiments are merely examples. Various modifications may be made without departing from the spirit and scope of these embodiments. The first to third exemplary embodiments may be combined with each other. Alternatively, the operation of each communication apparatus may be selected according to any of the first to third present exemplary embodiments.

The communication apparatus according to the above described exemplary embodiments is not limited to a digital camera or a printer, but may be a PC, a tablet terminal, or a mobile terminal, such as a mobile phone and a smart phone. Furthermore, the communication apparatus may be an image processing apparatus, such as a copying machine, a scanner, and a multifunction peripheral, or a digital household appliance, such as a television and a recorder.

In the above described exemplary embodiments, the wireless LAN conforming to the IEEE802.11 is described as an example. Other embodiments may employ wireless communication, such as a wireless universal serial bus (USB), Multi Band OFDM Alliance (MBOA), Bluetooth (registered trademark), Ultra Wide Band (UWB), and ZigBee®. Furthermore, in still yet other embodiments, wired communication medium, such as a wire LAN, may be employed. The UWB includes a wireless USB, wireless 1394, and WINET.

According to the above-described embodiments, port control can be effectively performed in executing a service between apparatuses.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-091422 filed Apr. 24, 2013, which is hereby incorporated by reference herein in its entirety.

What is claimed is:

1. A communication apparatus comprising:
a memory storing instructions; and
one or more processors that execute the instructions and cause the one or more processors to operate as:
a search unit configured to search for another communication apparatus capable of wireless LAN communication conforming to the IEEE802.11 standard series by transmitting a probe request signal in the wireless LAN conforming to the IEEE802.11 standard series;
a transmission unit configured to transmit, to the another communication apparatus searched by said search unit, a service discovery signal in the wireless LAN conforming to the IEEE802.11 standard series;
an acquisition unit configured to acquire, from a service discovery response signal in response to the service discovery signal transmitted by said transmission unit, information about a service of an application layer provided by the another communication apparatus;
a comparing unit configured to compare a service indicated by the information acquired by said acquisition unit and a service which the communication apparatus can execute;
a connecting unit configured to execute processing to establish connection with the another communication apparatus by the wireless LAN based on the information acquired by the acquisition unit;
a processing unit configured to execute processing to set an IP address to the communication apparatus after the connection with the another communication apparatus by the wireless LAN is established; and
a control unit configured to collectively open a plurality of Transmission Control Protocol (TCP) ports or a plurality of User Datagram Protocol (UDP) ports corresponding to a plurality of the respective services common to both the apparatuses, without executing a service search process in an IP layer, based on a result of the comparison performed by the comparing unit in response to setting of the IP address to the communication apparatus by the processing unit, if a plurality of services is identified by the acquisition unit.

2. The communication apparatus according to claim 1, wherein said acquisition unit acquires information indicating whether the another communication apparatus can provide a service specified by a user.

3. The communication apparatus according to claim 1, wherein an application layer is referred to as a service provision layer in a layer equal to or upper than a fifth layer in an open systems interconnection (OSI) reference model.

4. The communication apparatus according to claim 1, wherein the service is at least any of a printing service, a moving image streaming service, or a file transfer service.

5. The communication apparatus according to claim 1, wherein the wireless LAN conforming to the IEEE802.11 standard series includes Wi-Fi Direct.

6. The communication apparatus according to claim 1, wherein, if a plurality of services is identified by the acquisition unit, the control unit opens a port corresponding to each of the plurality of the identified services.

7. A method for controlling a communication apparatus, the method comprising:
searching for another communication apparatus capable of wireless LAN communication conforming to the IEEE802.11 standard series by transmitting a probe request signal in the wireless LAN conforming to the IEEE802.11 standard series;
transmitting, to the another communication apparatus searched, a service discovery signal in the wireless LAN conforming to the IEEE802.11 standard series;
acquiring, from a service discovery response signal in response to the transmitted service discovery signal, information about a service of an application layer provided by the another communication apparatus;
comparing a service indicated by the acquired information and a service which the communication apparatus can execute;
establishing connection with the another communication apparatus by the wireless LAN based on the acquired information;
setting an IP address to the communication apparatus after the connection with the another communication apparatus by the wireless LAN is established; and
collectively opening a plurality of Transmission Control Protocol (TCP) ports or a plurality of User Datagram Protocol (UDP) ports corresponding to a plurality of the respective services common to both of the apparatuses without executing a service search process in an IP layer, based on a result of the comparison in response to setting of the IP address to the communication apparatus, if a plurality of services is identified.

8. A non-transitory computer readable storage medium storing computer executable instructions for causing a computer to execute a method, the method comprising:
searching for another communication apparatus capable of wireless LAN communication conforming to the IEEE802.11 standard series by transmitting a probe request signal in the wireless LAN conforming to the IEEE802.11 standard series;
transmitting, to the another communication apparatus searched, a service discovery signal in the wireless LAN conforming to the IEEE802.11 standard series;
acquiring, from a service discovery response signal in response to the transmitted service discovery signal, information about a service of an application layer provided by the another communication apparatus;
comparing a service indicated by the acquired information and a service which the communication apparatus can execute;
establishing connection with the another communication apparatus by the wireless LAN based on the acquired information;
setting an IP address to the communication apparatus after the connection with the another communication apparatus by the wireless LAN is established; and
collectively opening a plurality of Transmission Control Protocol (TCP) ports or a plurality of User Datagram Protocol (UDP) ports corresponding to a plurality of the respective services common to both of the apparatuses, without executing a service search process in an IP layer, based on a result of the comparison in response to setting of the IP address to the communication apparatus, if a plurality of services is identified.

9. A communication apparatus comprising:
a memory storing instructions; and
one or more processors that execute the instructions and cause the one or more processors to operate as:
a search unit configured to search for another communication apparatus capable of wireless LAN communication conforming to the IEEE802.11 standard series by transmitting a probe request signal in the wireless LAN conforming to the IEEE802.11 standard series;

an acquisition unit configured to acquire, from a probe response signal in response to the probe request signal, information about a service of an application layer provided by the another communication apparatus;

a comparing unit configured to compare a service indicated by the information acquired by said acquisition unit and a service which the communication apparatus can execute;

a connection unit configured to execute processing to establish connection with the another communication apparatus by the wireless LAN based on the information acquired by the acquisition unit;

a processing unit configured to execute processing to set an IP address to the communication apparatus after the connection with the another communication apparatus by the wireless LAN is established, and a control unit configured to collectively open a plurality of Transmission Control Protocol (TCP) ports or a plurality of User Datagram Protocol (UDP) ports corresponding to a plurality of the respective services common to both of the apparatuses, without executing a service search process in an IP layer, based on a result of the comparison performed by the comparing unit in response to setting of the IP address to the communication apparatus by the processing unit, if a plurality of services is identified by the acquisition unit.

10. The communication apparatus according to claim 9, wherein said acquisition unit acquires information indicating whether the another communication apparatus can provide a service specified by a user.

11. The communication apparatus according to claim 9, wherein the application layer is referred to as a service provision layer in a layer equal to or upper than a fifth layer in an open systems interconnection (OSI) reference model.

12. The communication apparatus according to claim 9, wherein the service is at least any of a printing service, a moving image streaming service, or a file transfer service.

13. The communication apparatus according to claim 9, wherein the wireless LAN conforming to the IEEE802.11 standard series includes Wi-Fi Direct.

14. The communication apparatus according to claim 9, wherein, if a plurality of services is identified by the acquisition unit, the control unit opens a port corresponding to each of the plurality of the identified services.

15. A method for controlling a communication apparatus, the method comprising:

searching for another communication apparatus capable of wireless LAN communication conforming to the IEEE802.11 standard series by transmitting a probe request signal in the wireless LAN conforming to the IEEE802.11 standard series;

acquiring, from a probe response signal in response to the probe request signal, information about a service of an application layer provided by the another communication apparatus;

comparing a service indicated by the acquired information and a service which the communication apparatus can execute;

establishing connection with the another communication apparatus by the wireless LAN based on the acquired information;

setting an IP address to the communication apparatus after the connection with the another communication apparatus by the wireless LAN is established, and collectively opening a plurality of Transmission Control Protocol (TCP) ports or a plurality of User Datagram Protocol (UDP) ports corresponding to a plurality of the respective services common to both of the apparatuses, without executing a service search process in an IP layer, based on a result of the performed comparison in response to setting the IP address to the communication apparatus, if a plurality of services is identified.

16. A non-transitory computer readable storage medium storing computer executable instructions for causing a computer to execute a method, the method comprising:

searching for another communication apparatus capable of wireless LAN communication conforming to the IEEE802.11 standard series by transmitting a probe request signal in the wireless LAN conforming to the IEEE802.11 standard series;

acquiring, from a probe response signal in response to the probe request signal, information about a service of an application layer provided by the another communication apparatus;

comparing a service indicated by the acquired information and a service which the communication apparatus can execute;

establishing connection with the another communication apparatus by the wireless LAN based on the acquired information;

setting an IP address to the communication apparatus after the connection with the another communication apparatus by the wireless LAN is established, and collectively opening a plurality of Transmission Control Protocol (TCP) ports or a plurality of User Datagram Protocol (UDP) ports corresponding to a plurality of the respective services common to both of the apparatuses, without executing a service search process in an IP layer, based on a result of the performed comparison in response to setting the IP address to the communication apparatus, if a plurality of services is identified.

* * * * *